April 14, 1959 P. L. SPEICHER 2,882,060
MOBILE BROADCAST SPREADER
Filed Oct. 1, 1956 2 Sheets-Sheet 1
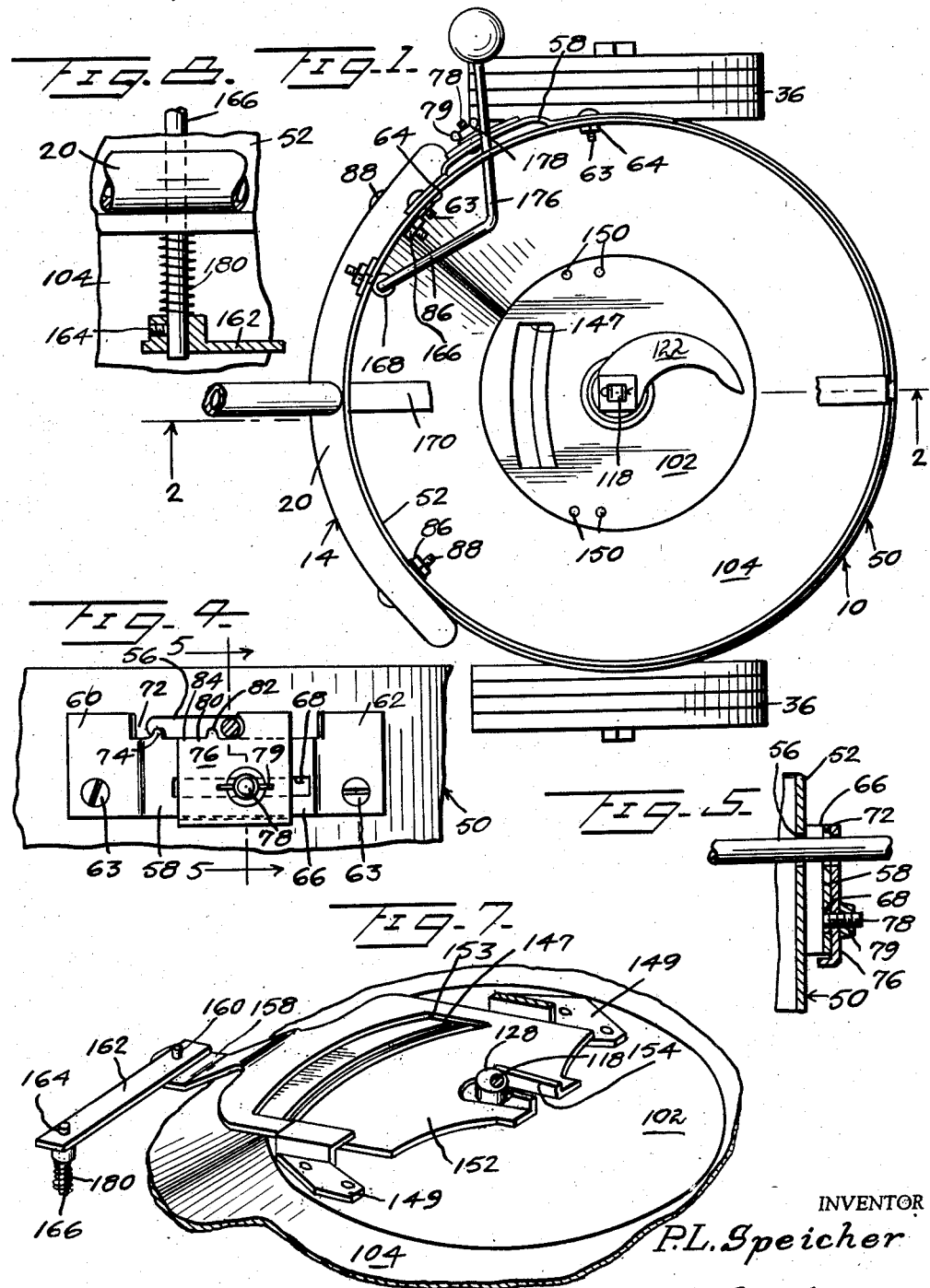
INVENTOR
P. L. Speicher
BY Kimmel & Crowell
ATTORNEYS

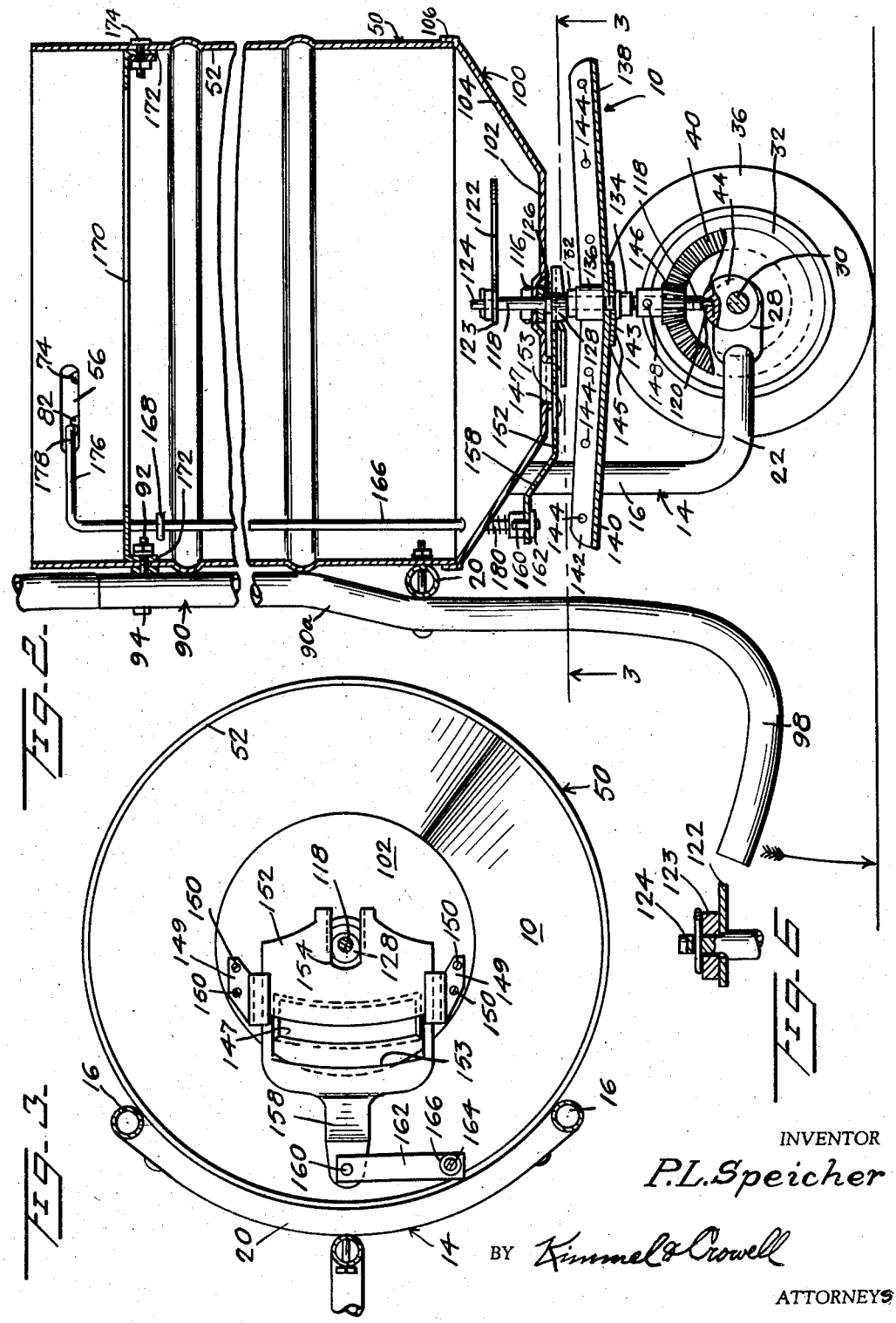

United States Patent Office 2,882,060
Patented Apr. 14, 1959

2,882,060

MOBILE BROADCAST SPREADER

Paul L. Speicher, Urbana, Ind., assignor to The Cyclone Seeder Co., Inc., Urbana, Ind., a corporation of Indiana Application October 1, 1956, Serial No. 613,260

2 Claims. (Cl. 275—15)

The present invention relates to mobile broadcast seeders, and more particularly to an improvement on my copending application Serial No. 517,240, filed June 22, 1955, and entitled Broadcast Seeder or Spreader Device, now Patent No. 2,843,387 issued July 15, 1958.

The primary object of the invention is to provide a mobile broadcast seeder having a completely balanced spread of broadcast material regardless of the rate of flow of the material.

Another object of the invention is to provide a mobile broadcast seeder in which the feed from a hopper is increased when a closure plate is moved radially inwardly and decreased as said plate is moved radially outwardly.

A still further object of the invention is to provide a mobile broadcast seeder of the class described above which is inexpensive to manufacture, simple to use, and which is completely effective in its action.

Other objects and advantages will become apparent in the following specification when considered in the light of the attached drawings, in which:

Figure 1 is a plan view of the invention shown partly broken away and in section for convenience of illustration.

Figure 2 is a fragmentary vertical cross-section taken along the line 2—2 of Figure 1, looking in the direction of the arrows with parts omitted for convenience of illustration.

Figure 3 is a horizontal cross-section taken along the line 3—3 of Figure 2, looking in the direction of the arrows with parts omitted for convenience of illustration.

Figure 4 is an enlarged fragmentary side elevation of the feed plate adjustment.

Figure 5 is a fragmentary vertical cross-section taken along the line 5—5 of Figure 4, looking in the direction of the arrows.

Figure 6 is an enlarged fragmentary detail, partially in section, of the agitator.

Figure 7 is a fragmentary inverted perspective illustrating the feed plate.

Figure 8 is an enlarged fragmentary rear elevation illustrating a detail of the invention, shown partly in section.

Referring now to the drawings in detail wherein like reference characters indicate like parts throughout the several figures, the reference numeral 10 indicates generally a mobile broadcast seeder constructed in accordance with the invention.

The broadcast seeder 10 comprises a substantially inverted U-shaped tubular chassis 14 having a pair of downwardly extending spaced and substantially parallel arms 16 integrally connected adjacent their respective upper ends by means of a tubular arcuately offset bight member 20. The arms 16 are integrally formed with a pair of laterally and forwardly extending tubular extension elements 22, terminating at their outer extremities in a pair of flat, spaced and substantially parallel bracket members 26, respectively. The bracket members 26 are each provided with a centrally poistioned opening, with the openings being aligned with each other, and having a shaft 30 journalled for rotation therein.

The shaft 30 projects beyond the remote sides of the brackets 26, and the extended ends thereof receive the wheels 32, one of which is keyed or otherwise conventionally secured thereto in driving relation therewith. The wheels 32 may be provided with solid or pneumatic tires 36, if desired.

A double ring gear 40 is mounted substantially centrally of the shaft 30. The gear 40 is fixedly secured on the shaft 30 by any suitable means and rotates therewith. An eccentric collar 44 is loosely mounted on the shaft 30 with one side thereof engaging the adjacent side of the gear 40 to prevent axial displacement of the collar 44 in the direction of the ring gear 40. Axial movement of the collar 44 in the other direction is prevented by any suitable means (not shown). As is seen in Figure 2 of the drawings, the collar 44 has a radially and inwardly extending bore 48 formed therein, to which further reference will be made below.

Reference numeral 50 designates, in general, a receptacle or hopper. The hopper 50 comprises an elongated upright cylindrical wall 52 having a pair of opposed upper and lower open ends. The upper end of the wall 52 is provided with an elongated slot 56. An elongated substantially rectangular plate 58 having offset end tabs 60, 62 is secured to the upper end of the wall 52 of the slot 56. The plate 58 is mounted thereon by bolts 63 and nuts 64 which pass through openings formed in the tabs 60, 62 and in the wall 52.

As is seen in Figures 1 and 5, the plate 58 has the central body portion 66 thereof spaced laterally from the adjacent portion of the wall 52 and is provided with a horizontally extending substantially rectangular guide slot 68. The upper end of the central body portion 66 is also formed with an elongated substantially U-shaped recess 72 substantially the same length as the slot 56. An upwardly projecting lug 74 extends from the body portion 66 adjacent one end thereof.

A substantially rectangular slide plate 76 is mounted on the central body portion 66 by the bolt 78 which extends through the slot 68 and the plate 76, with the plate 76 being secured in adjusted position thereon by means of a wing nut 79. The slide plate 76 has one of the upper corners notched as at 80 and is provided with a lug 82 which projects upwardly from the base 84 thereof intermediate its ends.

The wall 52 has the lower end thereof interfitted within the arcuate bight member 20 and is secured thereto by a plurality of nuts 86 and bolts 88. The arcuate bight member 20 also has secured thereto the lower end 90a of a handle member 90 by means of the nuts 92 and bolts 94. The upper end (not shown) of the handle member 90 is bent rearwardly to form an operating lever, and the lower end thereof is also rearwardly bent to form a prop 98.

The lower end of the cylindrical wall 52 is provided with a closure member 100 having an inverted truncated conical configuration including a base member 102 from which outwardly and upwardly flares a side wall 104, and the latter terminates in an annular cylindrical flange 106 which telescopically receives the lower end of wall 52.

The base member 102 is provided with a centrally positioned upwardly projecting cylindrical boss 116 through which extends an elongated bolt 118 threaded along the major portion of the lower end thereof, and its lower end 120 is reduced in diameter and is journalled in the bore 48. An arcuately curved agitator lever arm 122 has one of its ends 123 fixedly secured to the flat portion 124 of the upper end of the bolt 118.

A washer 126 is threaded on the bolt 118 and engages against the underside of the base member 102. A cam 128 is mounted on the bolt 118 immediately below the washer 126 and is secured thereto for rotation therewith by a set screw (not shown).

Nuts 132 and 134 threaded on the bolt 118 engage and clamp therebetween the upper and lower ends of an elongated substantially hollow cylindrical hub 136 forming a part of the impeller distributor 138. The impeller distributor 138 is formed of a plurality of sector-shaped plates 140 having vertically extending flanges 142 projecting therefrom along their respective longitudinally extending side edges.

The plates 140 are assembled in a substantially circular configuration with the adjacent flanges 142 of each adjacent pair of plates 140 being secured to each other by rivets 144 and spot welded. The inner ends of the flanges 142 are received within suitable axially extending slots (not shown) in the hub 136, and the inner ends of the plates 140 are connected to a circular disc 143 by rivets 145.

A bevelled gear 146 is mounted on the bolt 118 for rotation therewith and the downward displacement thereof is prevented by a set screw 148, and the bevelled gear 146 is meshed with the ring gear 40.

It will now be seen that rotation of the wheel 32 which is keyed to the shaft 30 rotates the ring gear 40. This rotary movement is transmitted to the bolt 118 through the bevelled gear 146 and causes the rotation of the agitator cycloid shaped lever 122, the cam 128, and the impeller distributor 138.

An elongated arcuate slot 147 is formed in the base member 102, and a pair of oppositely disposed spaced and confronting brackets 149 are fixedly secured to the underside of the base member 102 at opposite ends of the slot 147, respectively, by spot welds 150. An elongated substantially rectangular closure plate 152 is loosely mounted between and supported by the brackets 149 and extends across the slot 147.

A U-shaped slot 154 is formed in the plate 152 and is provided with side flanges 155 and 156 engaging opposite sides of the cam 128. An arm 158 projects from the other side of the plate 152 and the free end thereof is pivoted on pin 160 to one end of an elongated link 162. The other end of the link 162 is pivotally secured at 164 to one end of an elongated shaft 166.

As is seen in Figure 2 of the drawings, the shaft 166 projects upwardly from the link 162 through the edge of the side wall 104. The shaft 166, adjacent its upper end, extends through a screw eye 168 mounted in the upper end of the wall 52.

A cross bar 170 has the ends thereof bent laterally to form a pair of oppositely disposed tabs 172 which are fixedly secured to the upper end of the cylindrical wall 52 by means of bolts 94 and 174. The upper end of the shaft 166 terminates in a crank arm 176 having a portion 178 thereof which extends through the slot 56 and is received within the recess 72. The shaft 166 is constantly biased for movement downwardly by means of spring 180 which surrounds the lower end thereof and engages at on end the side wall 104 and abuts at its other end against the link 162.

From the above described linkage, it will be understood that the rotation of the crank arm portion 178 will effect a swinging movement of the link 162 which will turn the plate 152 towards or away from the bolt 118. The plate 152 is provided with an arcuate slot 153 corresponding in shape and size to the slot 147 in the bottom wall 102.

Thus, it is seen that the degree to which the slot 147 is opened or closed is controlled by the position of the crank arm portion 178. It will also be apparent that as the bolt 118 is rotated, the cam 128 also rotates and imparts oscillatory movement to the plate 152 about its pivot pin 160.

When the plate 152 is moved to its fully closed position, the crank arm portion 178 is disposed between the lug 74 and the adjacent end of the plate 58. However, when the handle portion 178 is moved in a direction to cause the slot 153 to be aligned with the slot 147, the handle portion 178 is lodged behind the lug 74 and the adjacent portion of the end of the recess 72.

Prior to using the above described seeder and spreader, the operator moves the plate 152 to an adjusted position after which the plate is locked in position by the wing nut 79. The crank arm portion 178 is moved from behind the lug 74 and is placed behind the lug 82, thus, at least partially aligning the slot 153 with the slot 147 to permit material to flow from the hopper 50 onto the distributor plate 138.

It will be noted that accordingly as the plate 152 moves inwardly towards the center of the hopper, the slot 147 is gradually opened to its fullest extent. Hence, the seeds or other material discharged from the hopper are deposited towards the center of the distributor disc 138, which it will also be noted is dished inwardly towards its center. Thus, the rate of feed of the seeds onto the distributor 138 is always decreased as the closure plate is moved radially outwardly and increased as said plate is moved radially inwardly insuring a completely balanced spread of seeds or other material from the distributor regardless of the rate of flow of the seeds or material from the hopper onto the distributor.

It will be understood reference to seeds means any material.

Having thus described the preferred embodiment of the invention, it should be understood that numerous structural modifications and adaptations may be resorted to without departing from the scope of the appended claims.

What is claimed is:

1. A mobile broadcast spreader comprising a hopper, a generally horizontal bottom wall supported in the lower end of said hopper, a shaft extending substantially vertically through said bottom wall and journalled for rotation therein, means connected to said shaft for rotating said shaft on forward movement of said spreader, an impeller distributor fixedly mounted on said shaft closely adjacent and underlying said bottom wall, said impeller distributor having a plurality of spaced apart upright radially extending flanges connected by a plurality of plates secured to the lower edges of said flanges, said plates sloping upwardly and outwardly from said shaft, said bottom wall having a transversely extending aperture formed therein between said shaft and the rear of said hopper with said aperture positioned so that material from said hopper dropped vertically through said aperture on to said distributor when rotating will be discharged from said distributor in a laterally equally distributed pattern completely forwardly of said hopper, said aperture in said bottom wall having an inner forward edge and an outer rear edge arranged in substantially uniformly spaced apart relation, a valve plate underlying said aperture, means supporting said valve plate beneath said bottom wall for adjustment radially of said bottom wall, said valve plate having a port formed therein adapted for registry with said aperture with said valve plate in fully opened position, said port having an inner forward edge and an outer rear edge, and means for adjusting said valve plate radially of said bottom wall reducing the effective discharge area of said aperture and reducing the area of the distributor on which the material falls vertically from said aperture by moving the inner forward edge of said port toward the outer rear edge of said aperture with the outer rear edge of the effective discharge area remaining radially fixed with respect to said distributor whereby the laterally equally distributed forward pattern of discharge of material will remain substantially unchanged and the rate of discharge will be varied in accordance with the adjustment of said valve plate.

2. A device as claimed in claim 1 wherein a cam is fixed on said shaft and means are provided on said valve plate engaging said cam for oscillating said valve laterally on rotation of said shaft.

References Cited in the file of this patent

UNITED STATES PATENTS

| | | |
|---|---|---|
| 321,703 | Foster | July 7, 1885 |
| 417,115 | Tecktonius | Dec. 10, 1889 |
| 2,327,266 | Hoffstetter | Aug. 17, 1943 |
| 2,334,376 | Bauer | Nov. 16, 1943 |
| 2,451,128 | Thiesse | Oct. 12, 1948 |
| 2,547,143 | Speicher | Apr. 3, 1951 |
| 2,661,955 | Sherer | Dec. 8, 1953 |

FOREIGN PATENTS

| | | |
|---|---|---|
| 200,148 | Australia | May 12, 1955 |